J. A. CHARTER.
METAL DISK WHEEL.
APPLICATION FILED MAR. 17, 1922.
1,423,598.
Patented July 25, 1922.
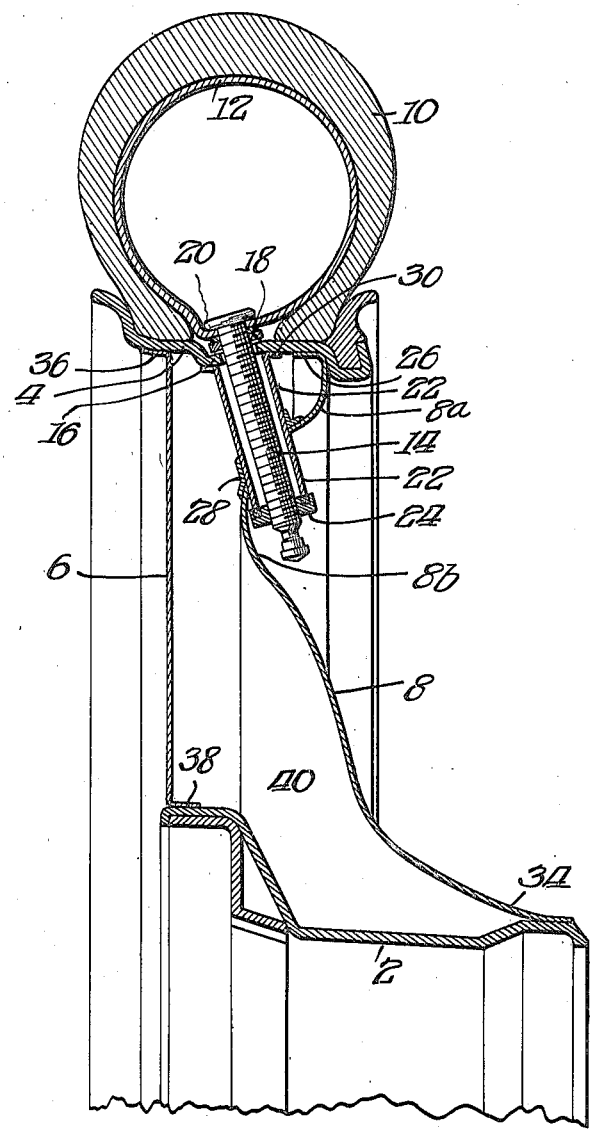
Inventor:
James A. Charter,
By Cheever & Cox
Attys.

UNITED STATES PATENT OFFICE.

JAMES A. CHARTER, OF CHICAGO, ILLINOIS.

METAL DISK WHEEL.

1,423,598. Specification of Letters Patent. Patented July 25, 1922.

Application filed March 17, 1922. Serial No. 544,445.

*To all whom it may concern:*

Be it known that I, JAMES A. CHARTER, a citizen of the United States, residing at Chicago, in the county of Cook and State of Illinois, have invented a certain new and useful Improvement in Metal Disk Wheels, of which the following is a specification.

This invention relates to metal wheels of the well known commercial type including the rim and hub and two spaced apart metallic disks each connecting the rim to the hub.

Pneumatic tires, as now commercially made, involve the use of an inner tube provided with a straight metallic valve stem through which air under pressure is introduced into the inner tube. This standard type of valve stem is made practically of one size for all sizes of tires and the commercial situation is such that they are distributed throughout the world where the automobile goes, so that they may be readily purchased almost anywhere.

The object of this invention is to construct a wheel of this general type so that a valve stem applied to the tube approximately centrally of the rim and under normal conditions prior to the making of this invention extending down through the rim in the vertical central plane of the rim, may have its air charging end brought out through one of the disks of the wheel to a point where it is readily accessible for the conventional operation of filling the inner tube with air.

A further object of the invention is to construct the disk of the wheel of uniform cross section on all diameters so that the wheel presents a much neater appearance than is possible where a pocket is provided at one point only for the exit of the valve stem.

The invention consists in means for attaining the foregoing objects and more particularly in a device in which the valve stem may be easily inserted and removed for ready use, and in many features and details of construction which will be hereafter more fully set forth in the specification and claims.

The single figure of the drawing represents a radial section of a wheel and tire attached thereto, taken at the point where the valve stem passes out of the wheel, illustrating this invention in its preferred form.

The wheel comprises a central hub 2, a rim 4, the inner disk 6 and outer disk 8, and is equipped with a tire 10 enclosing a conventional inner tube 12.

The rim 4 is, at the point where the valve stem 14 passes through it, provided as shown in the drawing, with a surface portion 16 which is angularly disposed to the main circumferential surface of the rim so that the valve stem passes through the rim at right angles to this angular surface 16, with the result that the conventional washers 18, under the head 20 of the valve stem 14 and the adjacent portion of the inner tube 12, rest flat upon this angular surface 16, thereby doing away with excessive danger of cutting the inner tube 12, due to a pinching of the tube material between the head 20 and the washers 18.

Rigidly attached to the inside of the rim 4 about the axis of the valve stem 14, is a tubular metal case 22 extending to approximately the outer end of the valve stem proper 14, where it is closed by the conventional nut 24 which is supplied with all commercial valve stems of this type. This nut shuts out all chance for moisture outside the wheel passing into the tube 22 and injuriously affecting the conventional screw threads on the valve stem.

The outer disk 8 of the wheel is made adjacent to the rim of the wheel with an inturned flange 26 welded to the rim. From this flange 26 the disk is formed in a reverse curve 8ª—8ᵇ of such a shape that the tube 22 passes through it, as shown in the figure, at a point about midway of the tube's length. The tube is secured to the outer disk 8 by any suitable means, as for instance a collar 28 welded to the tube and disk.

As the upper end of the tube 22, as viewed in the figure, is provided with a flange 30 welded to the inside of the rim, a very rigid construction is made at all points which have any relationship to this tube 22.

The curvature 8ª—8ᵇ of the disk is such that the retaining nut 24 of the valve stem and the air chuck on the end of the conventional filling hose, not shown, can be applied to the end of the valve stem 14 without interference through striking the adjacent portion of the disk. The parts are all so proportioned that the lower end of the valve stem lies wholly inside the plane of the front face, the right one, as viewed in the figure, of the rim, thereby avoiding all danger of "curbing" and thereby breaking the valve stem.

The central edge 34 of the disk 8 is secured to the hub 2 by welding in conventional manner.

The radial cross section of the disk 8 at all points around its circumference is the same as that shown in the drawing, the valve stem and its tubular case 22 appearing at only one point.

The annular groove 8ª—8ᵇ of the disk 8 is such that under the well known principles of corrugation in reinforcing a sheet, the disk is, in fact, stronger because of this construction than would be the case were this S-shaped curvature omitted.

The disk 6 is secured to the flange and rim by any suitable means, as for instance welding, at the points 36 and 38. When so welded, this disk and the front disk 8 form a unitary wheel without rivets or bolts, which completely excludes access of water or other moisture from the interior space 40 of the wheel, and entirely avoids the danger of wear of any of the four parts 2, 4, 6 and 8 one upon the other.

What I claim is:

1. A hollow metal wheel comprising a tire supporting rim carried from a hub by two separated metallic disks, the front disk having adjacent to the rim an annular groove so as to allow a straight inner tube valve stem which passes through a point approximately midway between the disks to extend diagonally through said front disk at a point in the side thereof, whereby the outer end of such a valve stem is free to receive conventional forms of valve nut and air chuck on an air supply hose, and yet is free from danger of being curbed while the wheel is in operation.

2. In a device of the class described, the combination of a metal wheel rim carried by two separated metal disks each secured thereto, one of said disks having, adjacent to said rim, an annular groove, a tube extending from the inside end of a perforation formed in the rim of the wheel, diagonally through said adjacent grooved part of the disk, means permanently securing said tube to the inside of the rim and to said disk, the parts being all so shaped that a valve stem inserted from outside the rim through said tube lies at a point in an indentation in the side of the disk where its air intake end is free for the application of a conventional air chuck.

3. In mechanism of the class described, a rim, two separated disks attached at opposite edges of and on the inside of said rim, one of said disks having an annular groove adjacent to the rim, a specially formed inclined surface, 16, at one point in the center of the rim, a tube secured to the inside of said rim about said inclined surface and extending through an adjacent wall portion of said grooved disk; means securing the tube to the disk and means detachably closing the outer end of the hub, the whole so shaped that when a conventional form of valve stem is inserted through a perforation in said angularly disposed surface leading into said tube, tube parts outside the rim carried by said valve stem lie substantially flat and parallel to said inclined surface at points immediately adjacent to said valve stem.

4. In mechanism of the class described, a wheel having a central hub, a concentric rim, two separated disks welded to said rim and to said hub to form an air space between them, a tube leading from a perforation in approximately the center of the width of the rim diagonally through an indented portion of one of said disks and a straight valve stem for an inner tube outside the rim inserted diagonally through said tube to a point in the indentation in said disk where a valve chuck and a valve stem nut may be conveniently applied to the end of the valve stem.

5. In mechanism of the class described, a hub 2, a rim 4 having at one point in its circumference an inclined surface 16, separated disks 6 and 8 attached respectively to said hub and to said rim, a tube 22 secured inside the rim adjacent to said surface 16 which is perforated for the reception of a valve stem, the opposite end portion of said valve stem passing through an annular groove in said disk 8, all of the parts being shaped and disposed as shown and described, for the purposes set forth.

6. A wheel having a rim, a hub and two metal disks separated from each other by being secured to the outer edges of the hub and rim; one of said disks being strengthened by providing an annular groove extending around it adjacent to the wheel rim.

7. A wheel having a rim, a hub and two metal disks separated from each other by being secured to the outer edges of the hub and rim; one of said disks being strengthened by providing an annular groove extending around it adjacent to the wheel rim, said groove adjacent to the rim being so shaped as to permit of a straight air tube at the rim center passing diagonally out into said groove where its end is protected from curbing and is yet ready of access.

In witness whereof, I have hereunto subscribed my name.

JAMES A. CHARTER.